US007739620B1

(12) United States Patent
Kong et al.

(10) Patent No.: US 7,739,620 B1
(45) Date of Patent: Jun. 15, 2010

(54) METHOD OF SETTING ALTERNATE STYLE ASSIGNMENTS TO MENU ELEMENTS OF AN APPLICATION

(75) Inventors: Sarah Kong, Cupertino, CA (US); Scott Byer, Cupertino, CA (US)

(73) Assignee: Adobe Systems Inc., San Jose, CA (US)

( * ) Notice: Subject to any disclaimer, the term of this patent is extended or adjusted under 35 U.S.C. 154(b) by 435 days.

(21) Appl. No.: 11/238,668

(22) Filed: Sep. 29, 2005

(51) Int. Cl.
*G06F 3/048* (2006.01)
*G06F 17/22* (2006.01)
(52) U.S. Cl. .................. 715/810; 715/828; 715/229; 715/764; 715/825
(58) Field of Classification Search ............ 715/810, 715/229, 764, 825, 828
See application file for complete search history.

(56) References Cited

U.S. PATENT DOCUMENTS

| | | | | |
|---|---|---|---|---|
| 5,420,975 | A * | 5/1995 | Blades et al. | 715/811 |
| 5,721,847 | A * | 2/1998 | Johnson | 715/786 |
| 6,184,998 | B1 * | 2/2001 | Tebeka | 358/1.15 |
| 6,259,446 | B1 * | 7/2001 | Matheny et al. | 715/764 |
| 6,324,511 | B1 * | 11/2001 | Kiraly et al. | 704/260 |
| 7,340,686 | B2 * | 3/2008 | Matthews et al. | 715/779 |
| 2003/0011641 | A1 * | 1/2003 | Totman et al. | 345/810 |
| 2005/0125744 | A1 * | 6/2005 | Hubbard et al. | 715/824 |
| 2005/0172262 | A1 * | 8/2005 | Lalwani | 717/109 |
| 2006/0101347 | A1 * | 5/2006 | Runov et al. | 715/764 |
| 2006/0218502 | A1 * | 9/2006 | Matthews et al. | 715/779 |
| 2006/0218503 | A1 * | 9/2006 | Matthews et al. | 715/779 |
| 2006/0277492 | A1 * | 12/2006 | Matthews et al. | 715/789 |
| 2006/0282790 | A1 * | 12/2006 | Matthews et al. | 715/767 |

OTHER PUBLICATIONS

Microsoft, Microsoft Windows operating system product, version 5.1 Buiild 2600 SP 2, published Aug. 6, 2004.*
Gabriel Oancea, Bob Donald, Microsoft, Visual Basic .Net by Example, published Que, published Dec. 28, 2001.*
John Sharp, Jon Jagger, Microsoft Visual C# .Net Step by Step: Version 2003, Mar. 19, 2003, Microsoft Press, 1-9.*
Microsoft XP SP2 ScreenDumps, Aug. 6, 2004, pp. 1-10.*
Microsoft.com, Windows XP Service Pack 2 Screen Dumps, dated 2001, pp. 1-4.*

* cited by examiner

*Primary Examiner*—Simon Ke
*Assistant Examiner*—Erik V Stitt
(74) *Attorney, Agent, or Firm*—Chapin IP Law, LLC

(57) ABSTRACT

A method, apparatus and computer program product for setting alternate style assignments to menu elements of an application are presented. At least one menu element of an application is selected. An alternate style is assigned to the at least one menu element. The at least one menu elements of the application is displayed, wherein the at least one menu element is presented in the alternate style assigned to the element.

25 Claims, 5 Drawing Sheets

METHOD OF SETTING ALTERNATE STYLE ASSIGNMENTS TO MENU ELEMENTS OF AN APPLICATION

BACKGROUND

A Graphical User Interface (GUI) is a program interface that takes advantage of a computer's graphics capabilities to make an application easier to use. GUIs can free a user from learning complex command languages. A typical GUI includes a pointer controlled by a pointing device, icons, a desktop area, windows and menus.

A pointer is a symbol that appears on the display screen and that a user moves to select objects and commands. Usually, the pointer appears as a small angled arrow, although different applications may incorporate different pointers. For example, many text-processing applications use a pointer that is shaped like a capital I. The pointer is controlled by way of a pointing device such as a mouse or trackball, which enables the user to select and manipulate objects on the display screen.

Icons are small pictures that represent commands, files, or windows. By moving the pointer to the icon and pressing a mouse button, the user can execute a command or convert the icon into a window. The user can also move the icons around the display screen. The area on the display screen where icons are grouped is often referred to as the desktop. The icons are intended to represent real objects on a real desktop.

A user can divide the display screen into different areas called windows. In each window, a user can run a different program or display a different file. Typically a user can move windows around the display screen, and change their shape and size at will.

Most applications now have a menu-driven component. A menu comprises a graphical list of operations (menu elements) a user can perform. Most graphical user interfaces let a user execute commands by selecting a choice from a menu. A user can choose an item from the menu by highlighting it and then pressing the Enter or Return key, or by simply pointing to the item with a mouse and clicking one of the mouse buttons.

In addition to their visual components, GUIs also make it easier to move data from one application to another. A GUI includes standard formats for representing text and graphics. Because the formats are well-defined, different programs that run under a common GUI can share data. This makes it possible, for example, to copy a graph created by a spreadsheet program into a document created by a word processor.

There are several different types of menus. One type is known as a pop-up menu. A pop-up menu appears temporarily when a mouse button is clicked on a selection. Once you make a selection from a pop-up menu, the menu usually disappears. A pull-down menu is a special type of pop-up menu that appears directly beneath the command selected by the user. A cascading menu is a submenu that opens when a user selects a choice from another menu.

Another type of menu is known as a moving-bar menu. In a moving bar menu, options are highlighted by a bar that a user can move from one item to another. Most menus are moving-bar menus. A menu bar is a menu arranged horizontally. Each menu option is generally associated with another pull-down menu that appears when a user makes a selection. A tear-off menu is a pop-up menu that a user can move around the screen like a window.

SUMMARY

Menus, when used as part of a GUI, have proven to be very useful and are ubiquitous. Conventional mechanisms for menus such as those explained above suffer from a variety of deficiencies. One such deficiency is that conventional menus provide a series of menu elements having a similar look. The menu elements typically have the same color and the same background. Thus, the menus do not provide additional help or information to a user.

Embodiments of the invention significantly overcome such deficiencies and provide mechanisms and techniques that provide a method of setting alternate style assignments for menu elements of an application.

In a particular embodiment of a method for setting alternate style assignments to menu elements of an application, the method includes selecting at least one menu element of an application. The method further includes assigning an alternate style to the at least one menu element. The method additionally includes displaying the at least one menu element of the application, wherein the at least one menu element is presented in the alternate style assigned to the element.

Other embodiments include a computer readable medium having computer readable code thereon for setting alternate style assignments to menu elements of an application. The medium includes instructions for selecting at least one menu element of an application. The medium also includes instructions for assigning an alternate style to the at least one menu element. The medium further includes instructions for displaying the at least one menu element of the application, wherein the at least one menu element is presented in the alternate style assigned to the element.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides setting alternate style assignments to menu elements of an application as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations setting alternate style assignments to menu elements of an application as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a computer device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
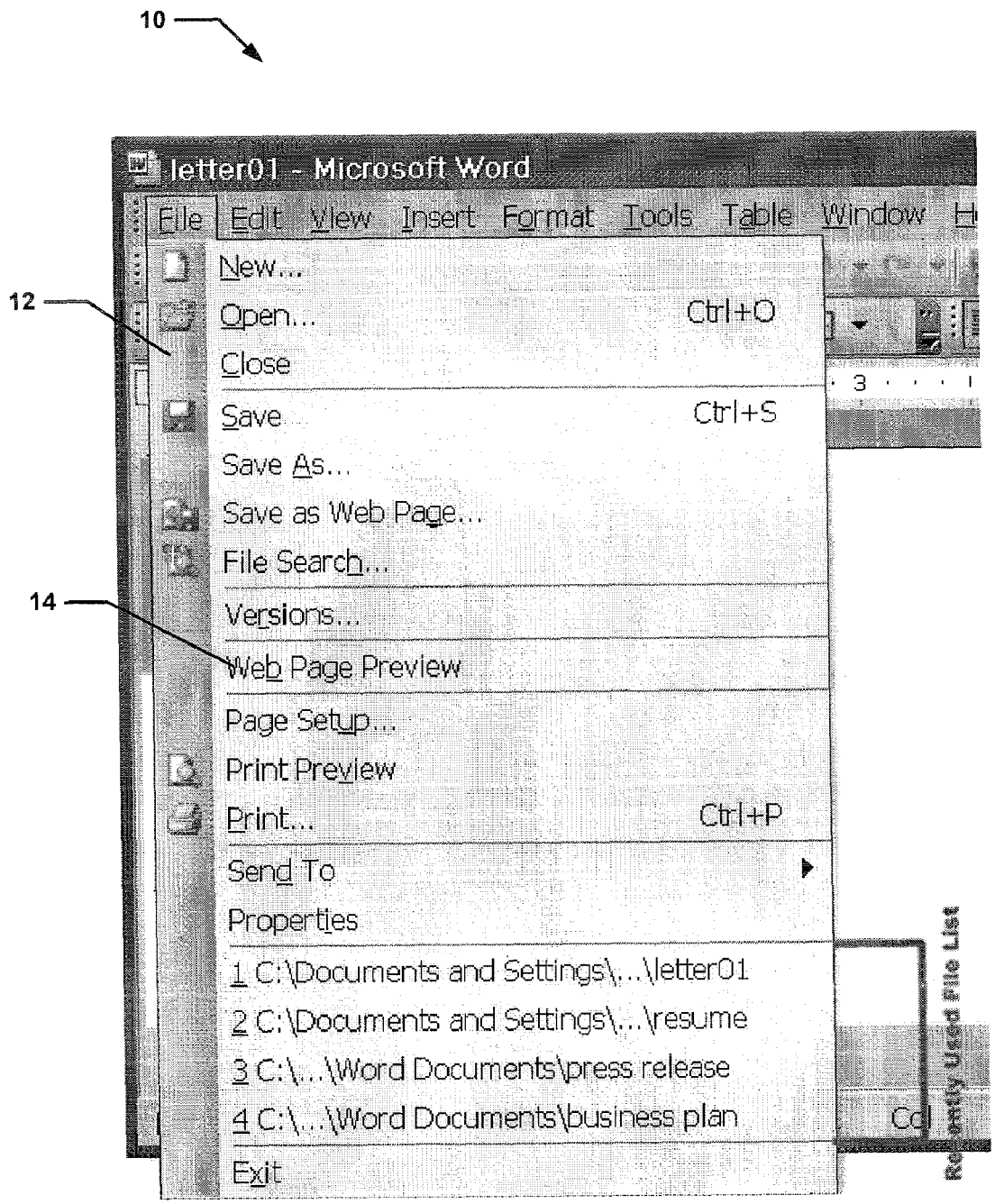
FIG. 1 comprises a prior art screen shot of an example pull-down menu showing a list of menu elements.

Referring to FIG. 1, a GUI 10 for a particular application is shown. Here the GUI is for a Microsoft Word application, however it should be understood that the concepts explained herein apply to any GUI and any application. GUI 10 includes a menu 12. Here, menu 12 has been provided in response to user selecting the "File" element of the application toolbar. It should be understood that the concepts explained herein apply to any menu element and to any menu. The resulting menu 12 provides the user with different options relating to the file, presented as a series of menu elements. A particular menu element 14 shows that one of the options the user has is to perform a "Web Page Preview" for the document. The menu element 14 includes a text portion 16 and a background portion 18. All the menu elements have a similar look in that the text for each menu element is the same color and size, and the backgrounds for each of the menu elements is the same color.

Figure 2:
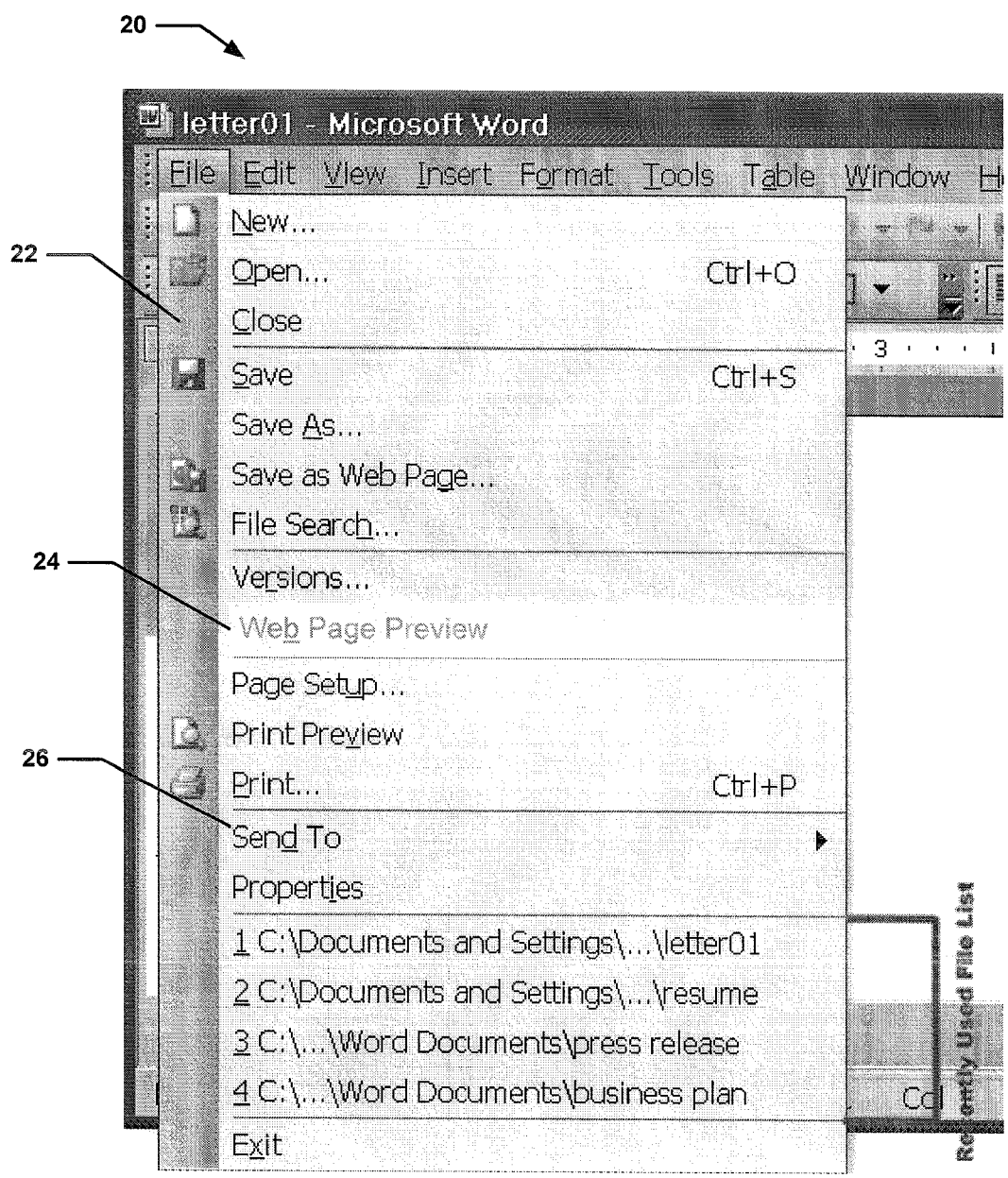
FIG. 2 comprises a screen shot of an example pull-down menu showing a list of menu elements wherein a selected menu element is provided having an alternate style (text) in accordance with embodiments of the present invention.

Referring now to FIG. 2, a menu 22 of GUI 20 is shown. In this menu, a menu item is presented in a manner that makes the menu element different from the other menu elements of menu 22. Here the menu element 24 is provided wherein the text portion is in an alternate style than the text portions of other menu elements. The background color has not changed. This changing of the menu element text is accomplished by the present invention. The basic configuration allows a dialog to allow a user to define what alternate style menu choices are to be set to. Alternately, the system may apply the different alternate styles for menu elements in response to certain user inputs (e.g. selecting help for a particular function, as will be described in detail below). The application can apply menu alternate styles to any application, since it can use a windows API to traverse the menu structure of that application to identify what menu choices the application shows to the user. The dialog then allows the user to custom select one or more of those choices to allow the user to set an alternate style for that choice. Thereafter, when the application displays that menu, the dialog can instruct windows to render that choice as per the user setting. In such a manner the menu element is presented such that the menu element is different than other menu elements of the same menu.

Figure 3:
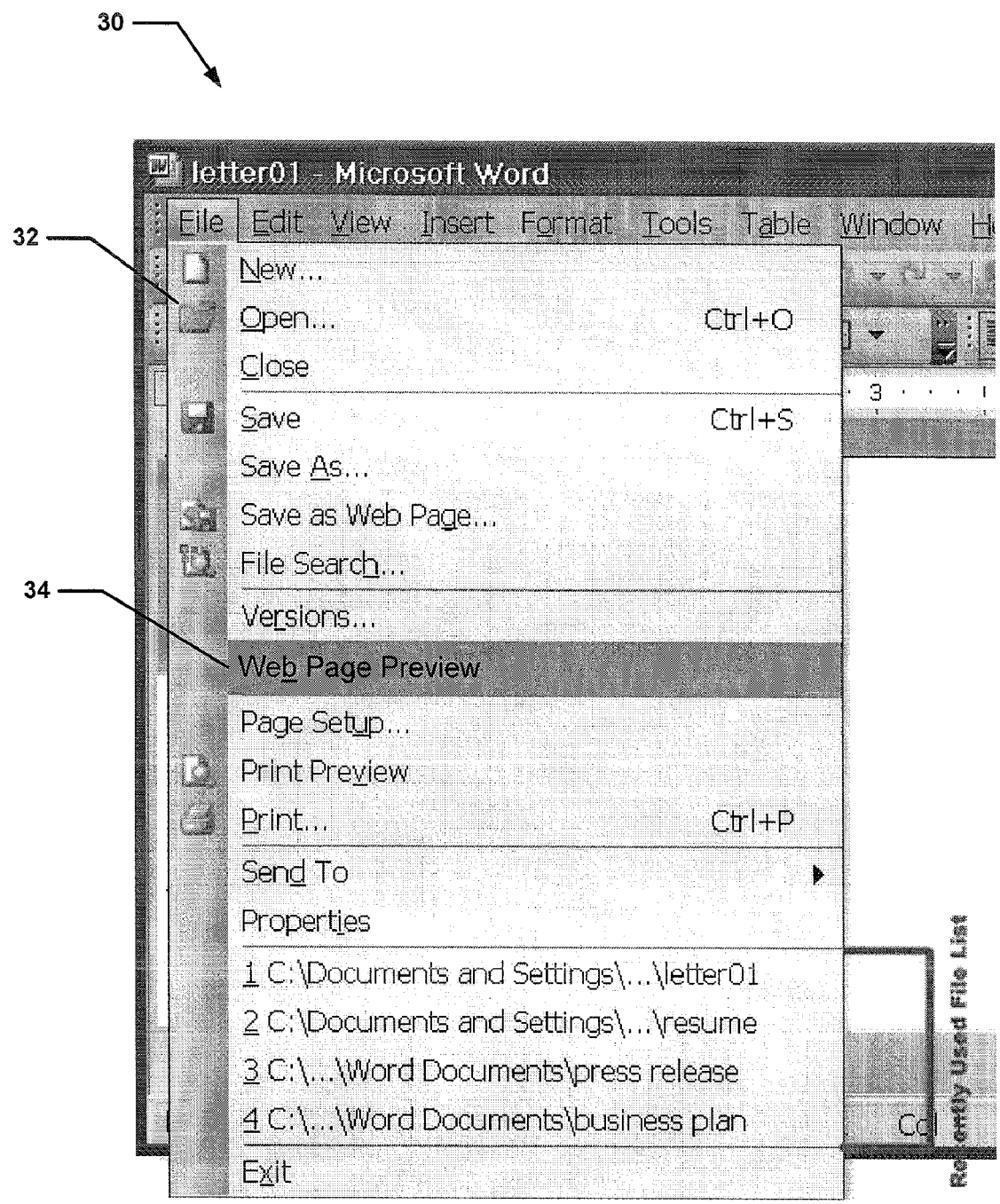
FIG. 3 comprises a screen shot of an example pull-down menu showing a list of menu elements wherein a selected menu element is provided having an alternate style (background) in accordance with embodiments of the present invention.

Referring now to FIG. 3, a menu 32 of GUI 30 is shown. In this menu, a menu item is presented in a manner that makes the menu element different from the other menu elements of menu 32. Here the menu element 34 is provided wherein the background portion is in an alternate style as compared to the background portions of other menu elements. The text color has not changed. This changing of the menu element background is accomplished by the present invention. The basic configuration allows a dialog to allow a user to define what alternate style menu choices are to be set to. The application can apply menu alternate styles to any application, since it can use a windows API to traverse the menu structure of that application to identify what menu choices the application shows to the user. The dialog then allows the user to custom select one or more of those choices to allow the user to set an alternate style for that choice. Thereafter, when the application displays that menu, the dialog can instruct the operating system to render that choice as per the user setting. In such a manner the menu element is presented such that the menu element is different than other menu elements of the same menu.

In one configuration, the menu items can be color coded to show differences in software versions. The alternate style may be realized as different font types, different colors, or the like. Thus, if a new release of a product comes out, the new menu choices can be color coded to correspond to the new version of software (e.g., all new features in yellow background have been added in new version). Also, each version of the software could have alternate style choices, so that version one items are all a first color (e.g. yellow), version two additions are all another color (e.g. blue), version three items are another color (e.g. red) and so forth.

Another use of alternate style menu items is to provide a tutorial for users in the form of following alternate style choices in drill down menus. Thus, if a user chooses help on a topic, the help might direct the user to the first top level menu and direct the user to follow all menu choices in yellow to get to where the user wants to be. For example, if a user wanted help regarding inserting a filename and path in a header in a Microsoft Word document, the insert menu would be presented. The menu element Autotext of the Insert menu would be highlighted, directing the user to click that menu element for further help information. Clicking on the highlighted Autotext menu element results in a Autotext menu wherein a Header/Footer menu element is highlighted. Clicking on the Header/Footer menu element results in a presentation of a Header/Footer menu wherein the Filename and Path element is highlighted.

The present invention may further be used to hide commands in a menu that are seldom or never used. The present invention may also be used to highlight (in color) commands in a menu that are used most often. A user further has the ability to switch among sets of edited menus on the fly.

In a particular embodiment, an Application Programming Interface (API) is used to traverse a menu structure of the application to identify menu choices presented to a user. The user, by way of the GUI, can assign a selected alternate style for a selected menu choice. For example, the user can select a text alternate style and/or a background alternate style. Thereafter, when the application displays that menu, that alternate style choice defined by the user is used for that menu element.

Figure 4:
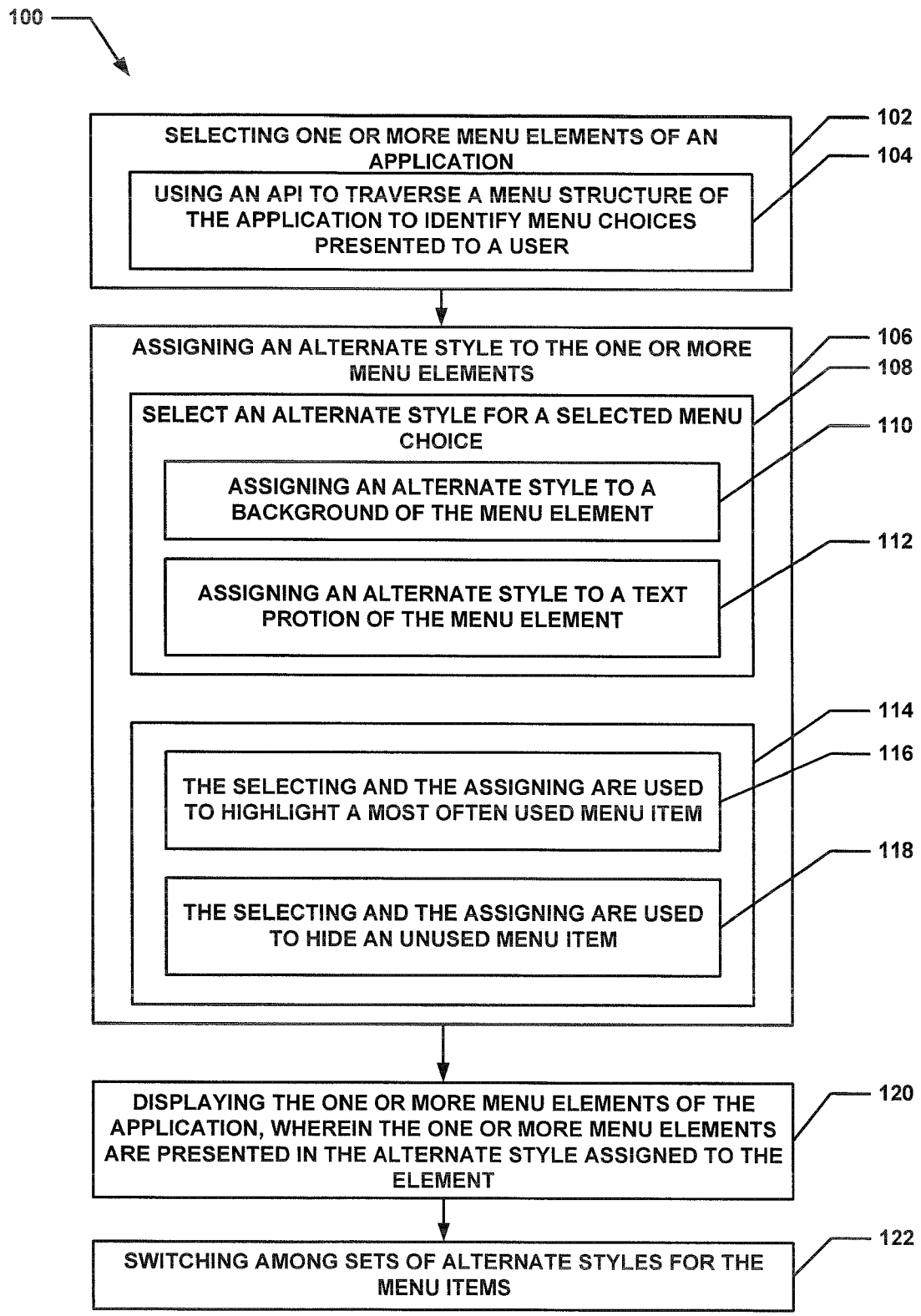
FIG. 4 illustrates a flow diagram of a process setting alternate style assignments to menu elements of an application in accordance with embodiments of the invention.

A flow chart of the presently disclosed method is depicted in FIG. 4. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a particular embodiment of a method 100 of setting alternate style assignments to menu elements of an application is shown. The method starts with processing block 102 wherein at least one menu element of an application is selected. The user thus determines that a particular menu element of a menu of an application should be changed, and selects the menu element. An example of this is Microsoft Word application, File menu wherein the Web Page Preview menu element 24 has been selected as shown in FIG. 2. In processing block 104 an API is used to traverse a menu structure of the application to identify menu choices presented to the user.

As recited in processing block 106 and 108 an alternate style is assigned to at least one menu element. This may include assigning an alternate style to a background portion of a menu element as recited in processing block 110 and/or can include assigning an alternate style to a text portion of a menu element, as recited in processing block 112. The selecting and assigning of alternate styles to menu elements can be done to highlight a most often used menu item, can be used to hide an unused menu element, show differences in software versions and provide a tutorial by directing a user to follow alternate style choices in at least one drilldown menu.

In processing block 114, the at least one menu element of the application is displayed, wherein the at least one menu element is presented in the alternate style assigned to the element. In processing block 116, the user can switch among sets of alternate styles for the menu items. Processing block 118 recites that the selecting and assigning are used to hide an unused item. Processing block 120 discloses displaying the one or more menu elements of the application, wherein the one or more menu elements are presented in the alternate style assigned to the element. Processing block 122 states switching among sets of alternate styles for the menu items.

Figure 5:
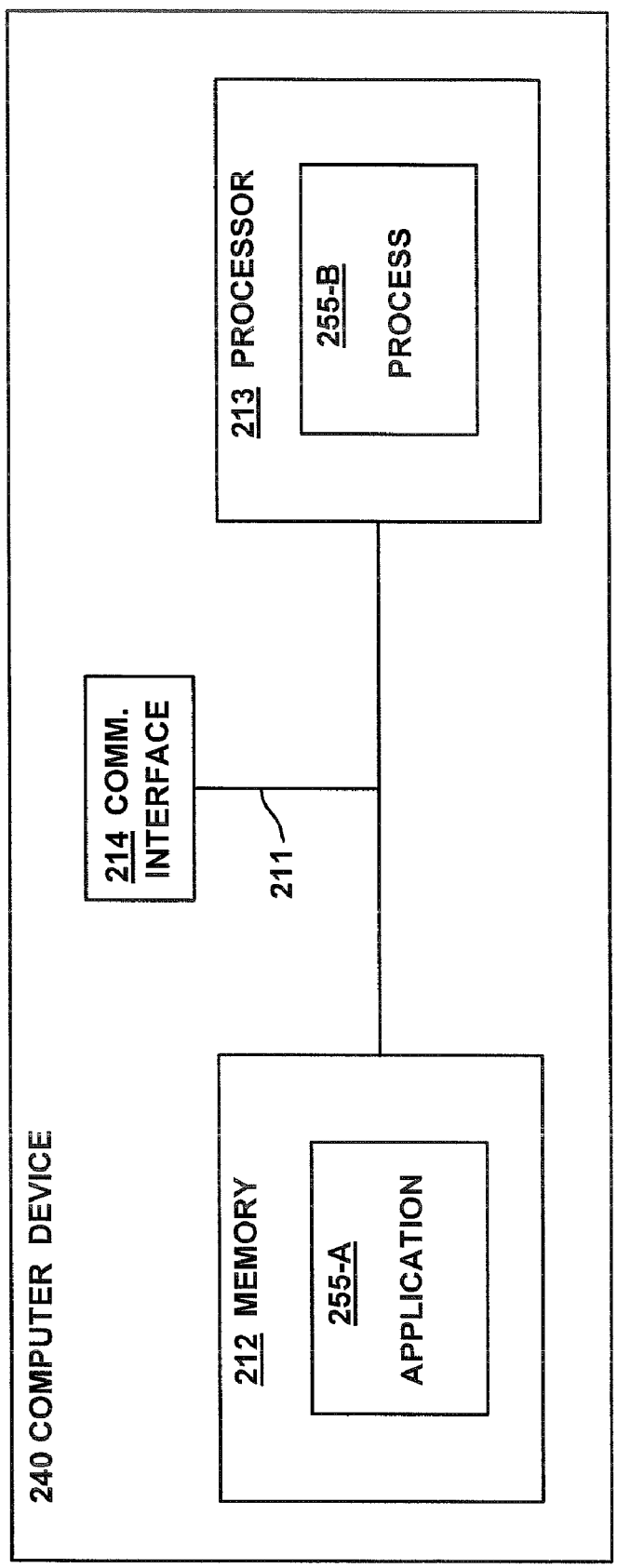
FIG. 5 illustrates an example computer system architecture for a computer system that provides the setting of alternate style assignments to menu elements of an application in accordance with embodiments of the invention.

FIG. 5 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which at least one computer system executes software code retrieved from storage to perform operations of:

producing a menu to include a set of selectable menu elements;

configuring a first version of a software application to enable display of the menu and the set of selectable menu elements;

updating the menu to include a given menu element having an alternate styling than a common styling associated with each of the selectable menu elements in the set, the alternate styling indicating that the given menu element represents a new feature in a second version of the software application; and configuring the second version of the software application to enable display of the updated menu, the second version of the software application enabling execution of the new feature based on selection of the given menu element having the alternate styling;

wherein the second version of the software application is a new software product release with respect to the first version of the software application;

wherein updating the menu includes:

generating the updated menu to include the set of selectable menu elements and the given menu element, the given menu element having a different styling than the common styling associated with each of the selectable menu elements in the set; and the different styling of the given menu element providing a visual indication that the new feature is newly available for selection and execution in the second version of the software application and that the new feature was unavailable for selection and execution in the first version of the software application;

wherein the new software product release is from a product vendor that produces the software application; and wherein configuring the second version of the software application to enable display of the updated menu comprises configuring the second version of the software application to display the updated menu as a pull-down menu in which a combination of the selectable menu elements in the set and the given menu element are displayed in the pull-down menu and the given menu element is displayed in an alternate style differing from other pull-down menu elements in the pull-down menu.

2. The computer-implemented method of claim 1 further comprising: implementing use of an API to traverse a menu structure associated with the software application to identify menu choices presented to a user.

3. The computer-implemented method of claim 2 further comprising: enabling the user to select the alternate style for the at least one menu element.

4. The computer-implemented method of claim 1, further comprising configuring the alternate style of the at least one menu element to have different highlighting than highlighting associated with the original style of the at least one menu element.

5. The computer-implemented method of claim 1, further comprising assigning an alternate style to a text portion of the menu element.

6. The computer-implemented method of claim 1 further comprising switching among sets of alternate styles for the menu items.

7. The computer-implemented method of claim 1, wherein the assigning of the alternate style to the at least one menu element creates a tutorial by directing a user to follow alternate style choices in at least one drilldown menu of the software application.

8. The computer-implemented method of claim 1 further comprising:

displaying a dialog enabling a user to choose a styling associated with the alternate style of the at least one menu element.

9. The computer-implemented method as in claim 1 further comprising:

assigning the given menu element to include text and a background associated with the text, the background of the given menu element being visually unique with respect to a common background associated with each of the selectable menu elements in the set.

10. The computer-implemented method as in claim 1 further comprising:

assigning text of the given menu element to be a different color than a common color assigned to text associated with each of the selectable menu elements in the set.

11. The computer-implemented method as in claim 1 further comprising:

configuring the second version of the software application to display a dialog enabling a user to select the alternate styling.

12. A computer-implemented method as in claim 1, further comprising:

configuring a third version of the software application to display a second visual styling to indicate a particular menu element that is new to the third version of the software application, the particular menu element not being available in the first version and the second version of the software application, the second visual styling being different than the first visual styling.

13. A computer-implemented method as in claim 1 further comprising:

configuring the software application to include a tutorial, the tutorial directing a respective user of the software application to select multiple menu elements of a particular unique visual styling in order to carry out a specific function supported by the software application.

14. A computer-implemented method as in claim 13 further comprising:

configuring the tutorial in the software application to:
highlight a first menu element with the particular unique visual styling to direct the user to select the first menu element, the first menu element displayed in a first menu;
in response to receiving selection of the first menu element, highlight a second menu element with the particular unique visual styling to direct the user to select the second menu element, the second menu element displayed in a second menu.

15. A computer-implemented method as in claim 14 further comprising:

configuring the tutorial to:
in response to receiving selection of the second menu element, highlight a third menu element with the particular unique visual styling to direct the user to select the third menu element, the second menu element displayed in a third menu.

16. The computer-implemented method as in claim 1 further comprising:

configuring the second version of the software application to display the updated menu as a vertical menu in which a combination of the selectable menu elements in the set and the given menu element are displayed in columnar form.

17. A computer readable storage medium having instructions stored thereon for processing data information, such that the instructions, when executed by a processing device, enable the processing device to perform operations of:

producing a menu to include a set of selectable menu elements;

configuring a first version of a software application to enable display of the menu and the set of selectable menu elements;

updating the menu to include a given menu element having an alternate styling than a common styling associated with each of the selectable menu elements in the set, the alternate styling indicating that the given menu element represents a new feature in a second version of the software application; and configuring the second version of the software application to enable display of the updated menu, the second version of the software application enabling execution of the new feature based on selection of the given menu element having the alternate styling; and wherein the second version of the software application is a new software product release with respect to the first version of the software application;

wherein updating the menu includes:

generating the updated menu to include the set of selectable menu elements and the given menu element, the given menu element having a different styling than the common styling associated with each of the selectable menu elements in the set; and the different styling of the given menu element providing a visual indication that the new feature is newly available for selection and execution in the second version of the software application and that the new feature was unavailable for selection and execution in the first version of the software application;

wherein the new software product release is from a product vendor that produces the software application; and wherein configuring the second version of the software application to enable display of the updated menu comprises configuring the second version of the software application to display the updated menu as a pull-down menu in which a combination of the selectable menu elements in the set and the given menu element are displayed in the pull-down menu and the given menu element is displayed in an alternate style differing from other pull-down menu elements in the pull-down menu.

18. The computer storage medium of claim 17 wherein the instructions for selecting comprises instructions for using an API to traverse a menu structure of the application to identify menu choices presented to a user.

19. The computer storage medium of claim 18 wherein the instructions for assigning includes instructions for allowing the user to select an alternate style for a selected menu choice.

20. The computer storage medium of claim 17 wherein the instructions for assigning an alternate style comprises instructions for assigning an alternate style to a background of the menu element.

21. The computer storage medium of claim 17 wherein the instructions for assigning an alternate style comprise instructions for assigning an alternate style to a text portion of the menu element.

22. The computer storage medium of claim 17 wherein the instructions for selecting and the instructions for assigning include instructions for highlighting a most often used menu item.

23. The computer storage medium of claim 17 further comprising instructions for switching among sets of alternate styles for the menu items.

24. The computer storage medium of claim 17 wherein the instructions for selecting and the instructions for assigning include instructions for providing a tutorial by directing a user to follow alternate style choices in at least one drilldown menu.

25. The computer storage medium of claim 18 wherein the instructions for selecting at least one menu element of an application comprises instructions for using a dialog that allows the user to select a menu element to set an alternate style for the selected menu element, and wherein the instructions for displaying the at least one menu element comprises instructions for using the dialog for presenting the selected menu element in the alternate style assigned to the element.

* * * * *